United States Patent [19]
Dürschner

[11] 3,914,530
[45] Oct. 21, 1975

[54] BEARING FOR THE SUPPORT OF THE INNER CONDUCTOR OF AN ENCAPSULATED TUBULAR LINE SUPPORT IN A SUPPORT INSULATOR

[75] Inventor: Rolf Dürschner, Mohrendorf, Germany

[73] Assignee: Siemens Aktiengesellschaft, Munich, Germany

[22] Filed: Aug. 29, 1974

[21] Appl. No.: 501,744

[30] Foreign Application Priority Data
Sept. 18, 1973  Germany............................ 2347003

[52] U.S. Cl................................ 174/28; 174/99 R
[51] Int. Cl.² ........................................ H01B 9/04
[58] Field of Search............ 174/16 B, 28, 29, 99 R, 174/111, 100; 29/203 C

[56] References Cited
UNITED STATES PATENTS

| | | | |
|---|---|---|---|
| 2,754,349 | 7/1956 | Werner................... | 174/28 |
| 3,324,272 | 6/1967 | Shankle et al. ................... | 174/28 X |
| 3,356,785 | 12/1967 | Yoshida et al....................... | 174/28 |
| 3,391,243 | 7/1968 | Whitehead........................... | 174/28 |
| 3,585,270 | 6/1971 | Trump................................. | 174/28 |
| 3,652,778 | 3/1972 | Sakai................................... | 174/28 |
| 3,809,795 | 5/1974 | Olsen et al.......................... | 174/28 |

FOREIGN PATENTS OR APPLICATIONS

| | | | |
|---|---|---|---|
| 835,465 | 3/1952 | Germany............................. | 174/28 |
| 856,241 | 6/1940 | France................................ | 174/28 |
| 826,940 | 1/1952 | Germany............................. | 174/28 |
| 533,982 | 2/1941 | United Kingdom.................. | 174/28 |

*Primary Examiner*—Arthur T. Grimley
*Attorney, Agent, or Firm*—Kenyon & Kenyon Reilly Carr & Chapin

[57] ABSTRACT

A bearing for a support insulator supporting the inner conductor of an encapsulated, gas-insulated tubular line, the support insulator including a control electrode on its side facing the inner conductor in which a split annular bearing located between the control electrode and the inner conductor has at least two holes into which electrically conductive parts, connected to each other by a contact spring, are in contact with the inner conductor with the contact spring establishing an electrical contact with the electrode to provide a bearing which requires no servicing and which results in a durable electrically connection between the inner conductor and control electrode.

10 Claims, 4 Drawing Figures

BEARING FOR THE SUPPORT OF THE INNER CONDUCTOR OF AN ENCAPSULATED TUBULAR LINE SUPPORT IN A SUPPORT INSULATOR

BACKGROUND OF THE INVENTION

This invention relates to encapsulated, gas-insulated tubular conductors in general and more particularly to an improved bearing for inclusion in the support insulator supporting an inner conductor in an encapsulated tubular line.

In encapsulated gas-insulated tubular lines used for transmission of electrical energy the inner conductor carrying the voltage and current must be supported with respect to the sheath of the tubular line using special support elements. This tubular line sheath is normally grounded. Because of this the insulators supporting the inner conductor are provided with a control electrode or grading electrode on their side facing the inner conductor. The control electrode is used for breaking down, as uniformly as possible, the electrical field between the inner conductor and the sheath without the occurrence of point discharge effects. Since the inner conductor carries large currents it will be subject to temperature variations dependent upon the current magnitude and will alternatively shrink and expand. The sheath of the tubular line will also undergo length changes in dependence on the surrounding temperature.

In view of these various effects taking place and the necessity of having a control electrode which operates well, it is the object of the present invention to provide a sliding bearing for use in supporting the inner conductor on the support insulator in an encapsulated gas insulated tubular line which at the same time maintains a durable electrical connection between the inner conductor and the control electrode.

SUMMARY OF THE INVENTION

The present invention solves this problem through the use of a split annular bearing located between the control electrode and the inner conductor with the bearing having at least two holes therein. In these holes electrically conductive parts connected to each other by a contact spring are located making contact with the inner conductor. The contact spring connecting then makes contact with the electrode. The sliding bearing connection between the inner conductor and the control electrode is obtained through the use of a split annular bearing consisting of strip material inserted as a bearing between the control electrode and inner conductor. It is assembled so that a slit remains between it ends after assembly in order to compensate for tolerances. The electrically conductive parts connected to each other through a contact spring are used to establish a good electrical connection between the inner conductor and control electrode. The contact connection runs from the inner conductor to the electrically conductive parts and from these parts to the contact spring connecting them and then to the control electrode.

A particularly good annular bearing can be made of a flat, carbon-enriched strip of polytetrafluorethylene with its ends cut at an angle. By cutting the ends of the strip at an angle a shape which is advantageous after assembly results. By using carbon-enriched polytetrafluorethylene as the bearing material, a dry running, wear-resistant and self-lubricating bearing results. Because of these advantageous properties, the bearing can be used for long periods of time without any maintenance being necessary.

Preferably the control electrode will be provided with a slot on its side facing the inner conductor for the purpose of retaining the split annular bearing. The depth of the slot should be less in thickness of the bearing. This prevents the bearing from slipping out of its assembled location between the control electrode and the inner conductor. Furthermore, the relatively shallow depth of the slot in the control electrode insures that only the bearing itself provides the sliding bearing contact between the inner conductor and support insulator even if the inner conductor and support insulator are slightly tilted with respect to each other.

It is further advantageous for the control electrode to have a second slot to accomodate the electrical conductive parts with the dimensions of the second slot being such that after permanent assembly of the bearing, the electrically conductive parts in contact with the inner conductor to not touch the control electrodes and that the control electrode have a third slot in which the contact spring is mounted laterally, the dimensions of the third slot be only slightly larger than the cross-section of the contact spring. Preferably all three slots in the control electrode will be arranged symmetrically to a common centerline. The use of the slots is an advantageous control electrode design which provides a sliding bearing for the control electrode on the inner conductor as well as providing for mounting elements for the voltage connection between the inner conductor and the control electrode. By designing the second slot so that it touches the electrically conductive parts in contact with the inner conductor but not the contact spring in any event insures a definite electrical path between the control electrode and the elements to establish a good electrical connection.

Advantageously the contact spring will be bent in such a manner that in the assembled condition it pushes the electrically conductive parts against the inner conductor continously while at the same time pressing itself into firm contact with the control electrode through the counterpressure so generated. This initial bending of the spring insures that the contact pressure required for a good electrical connection between the conductive parts and the inner conductor as well as between the control electrode and the contact spring is always present.

The holes in the split annular bearing may be elongated holes. Advantageously, the electrically conductive parts are balls made of brass. By using elongaged holes in the bearings and electrically conductive parts in the form of balls the problem of guiding the motion of the contact elements on the inner conductor is solved in a particularly simple manner. In view of the thermal expansion of the inner conductor and the desire to establish a durable and abrasion resistance electrical connection, the ball shape is largely optimized solution for this purpose. Furthermore, from the aspect of a durable and wear-resistant electrical connection, the use of bronze as the ball material is considered as particularly advantageous.

DETAILED DESCRIPTION OF THE PREFERRED EMBODIMENT

Figure 1:
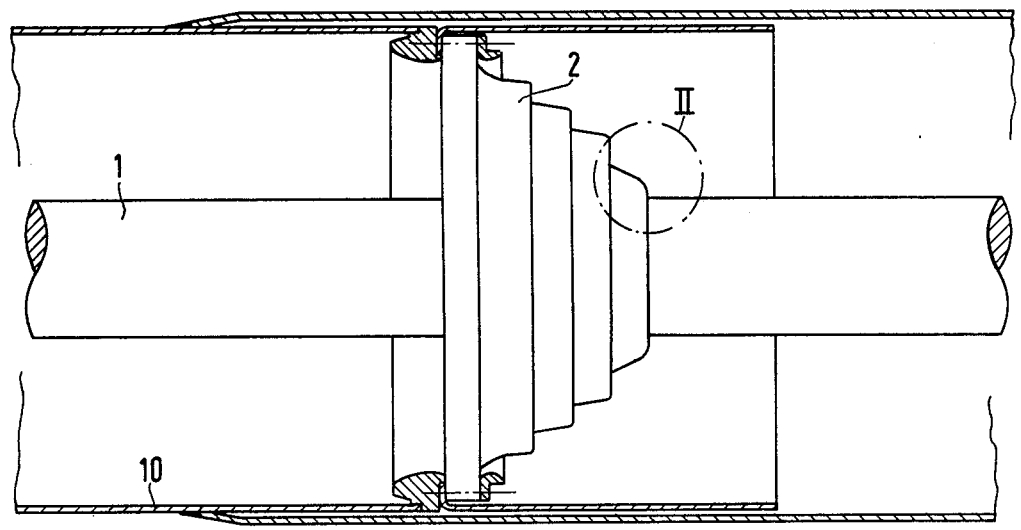
FIG. 1 is a schematic elevation view partially in cross-section illustrating an inner conductor within a tubular line.

FIG. 1 illustrates the basic arrangement in which the inner conductor 1 of an encapsulated gas insulated tubular line is supported inside the sheath 10 by means of a support insulator 2. In the area where the inner conductors are supported, the sheath has a double wall as shown. A bearing for the support of the inner conductors is provided within the insulator 2 in the circled area indicated as II.

Figure 2:
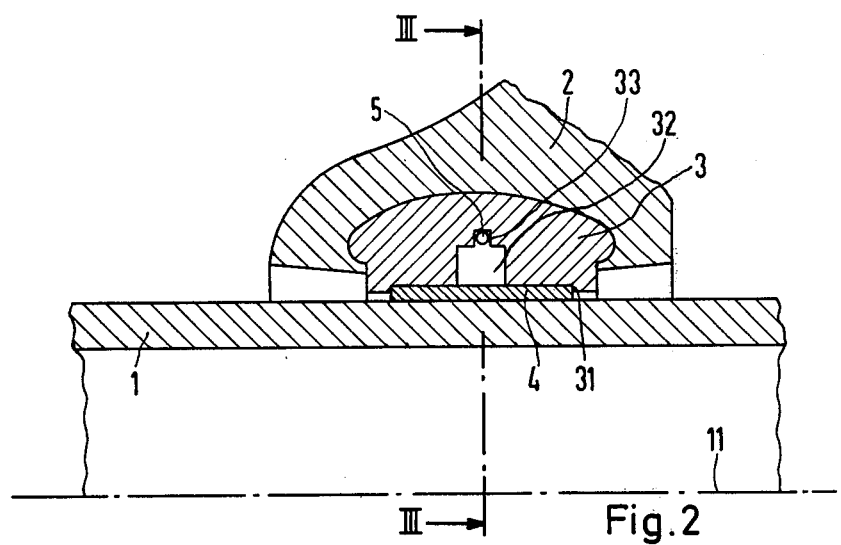
FIG. 2 is a longitudinal section of the preferred embodiment of the present invention and corresponds to a small portion of FIG. 1.
Figure 3:
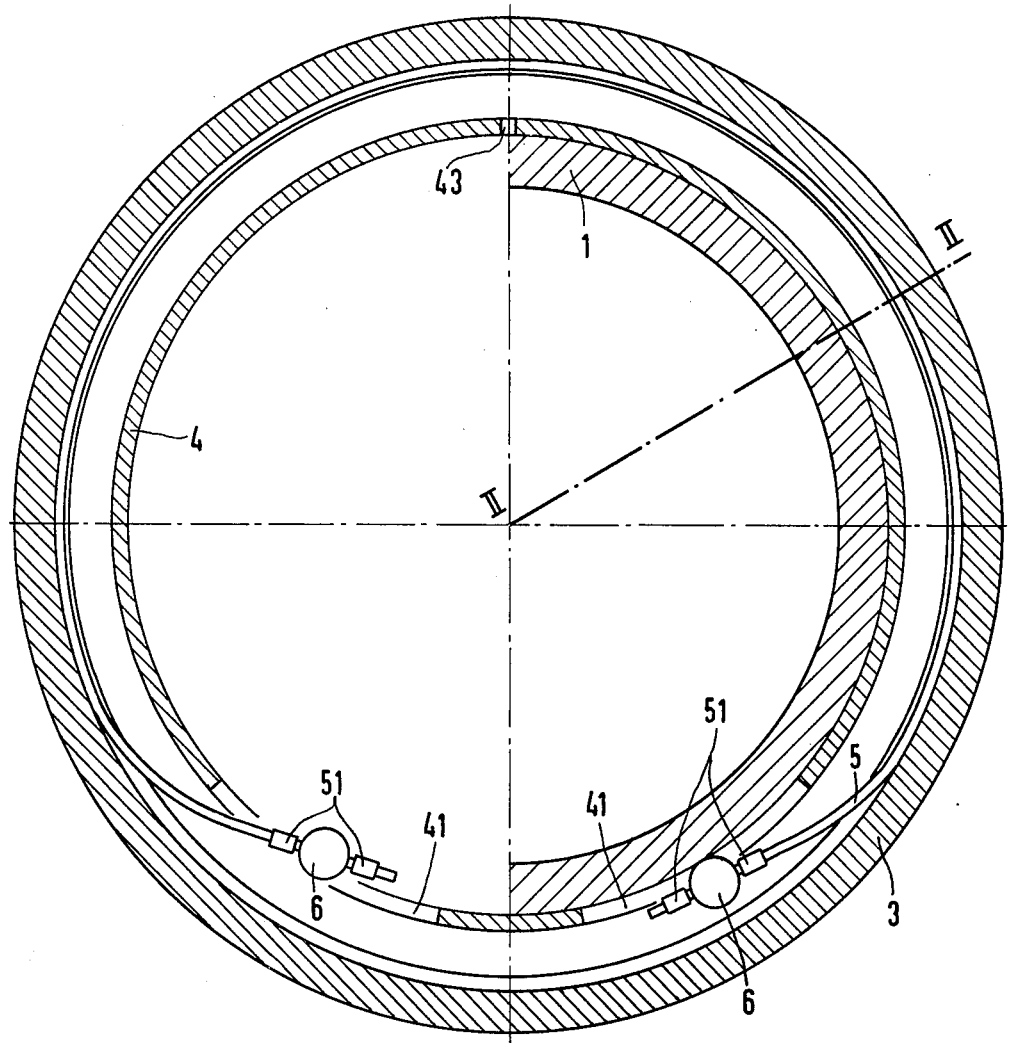
FIG. 3 is a cross-section of the embodiment of FIG. 2 along the line III—III.

This circled area is shown in more detail on FIGS. 2 and 3. FIG. 2 represents in detailed cross-section the circled area 2. It also represents a section along line II—II of FIG. 3 at the area where the inner conductor 1 is supported in support insulator 2. Since the bearing has rotation symmetry with respect to the axis of symmetry 11 only one side is shown. Closest to the axis 11, the wall of the inner tubular conductor 1 is shown. A split annular bearing 4 rests directly on this outer wall of the inner conductor. The control electrode is then mounted on top of the split annular bearing and is itself embedded in the support insulator 2. On its side facing the inner conductor 1, the control electrode 3 contains a slot 31 for the lateral retention of the bearing 4. As a result after assembly the split annular bearing 4 can no longer change its position relative to the control electrode. Two more slots designated 32 and 33 are provided in the control electrode 3 symmetrical to a common centerline III—III. The larger of the slots is used for providing freedom of motion for the electrically conductive parts, not shown on this figure, which rest on the inner conductor as contact elements. The outer smaller slot 33 is used for retaining a contact spring 5 shown on FIG. 2, which has at its ends, the two electrically conductive parts which establish with the inner conductor. The relationship between the electrically conductive parts and the contact spring 5 is illustrated by FIG. 3.

FIG. 3 shows in a particularly clear manner how a durable and wear-resistant electrical connection between the inner conductor and the control electrode is established. There are first of all two bronze balls 6 used to make this contact. Electrical connection between the two balls 6 is provided by a contact spring 5. The bronze balls 6 are retained on the contact spring 5 using plug in sleeves 51 clamped on at the ends of the contact spring. On the right hand side of FIG. 3 the inner conductor 1 is shown in place and on the left hand side, the arrangement is shown without the inner conductor in place to illustrate the preloading of the spring contact 5. This preloading is such that when the inner conductor 1 is not in place the bronze balls 6 are pushed by the force of the spring 5 through elongated holes 41 in the split annular hearing into the empty interior of the bearing. After insertion of the inner conductor 1 the bronze balls 6 make firm contact with the outside wall of the inner conductor. The contact spring 5 is then firmly pressed in the slot 33 against the control electrode through the counterforce acting in an outward direction. In this manner a definite electrical path between the inner conductor 1, the bronze ball 6, the contact spring 5 and the control electrode 3 is established. The control electrode will be at the same potential as the inner conductor and will thus perform its function of uniformly breaking down the field between the inner conductor 1 and the sheath 10 of the tubular line.

Figure 4:
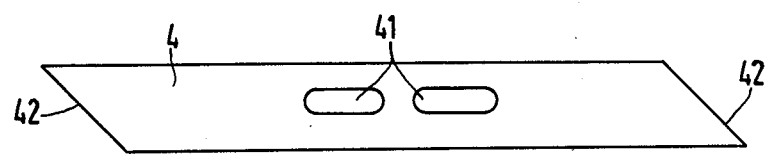
FIG. 4 is a plan view of the developed split annular bearing.

FIG. 4 shows a developed split annular bearing 4. A flat strip cut at an angle at its end 42 is shown. Preferably the strip will be carbon-enriched polytetrafluorethylene. Holes 41 for guiding the bronze balls 6 are provided in the split annular bearing 4. As illustrated these may be elongated holes. However, it is also possible to use two juxtaposed split annular bearings without holes, using the spacing between the bearings to guide the bronze balls on the inner conductor. In that case the spacing between bearings provides the function of the elongated holes shown on FIG. 4.

These and other modifications may be made without departing from the spirit of the invention which is intended to be limited solely by the appended claims.

What is claimed is:

1. A bearing for the support of the inner conductor of an encapsulated, gas-insulated tubular transmission line, the bearing being in a support insulator extending between the inner conductor and the encapsulation which support insulator includes a control electrode comprising:
   a. a split annular bearing having at least two holes therein located between the control electrode and the inner conductor;
   b. at least first and second conductive parts in said holes;
   c. a contract spring connecting said first and second electrical conductive parts, said contact spring resting against the control electrode and causing said conductive parts to rest against said inner conductor whereby an electrical connection is established between said inner conductor and said control electrode through said conductive parts and said contact spring.

2. A bearing according to claim 1 wherein said split annular bearing is made from a flat strip of carbon enriched polytetrafluorethylene whose ends are cut at an angle.

3. A bearing according to claim 1 wherein said control electrode has on its side facing the inner conductor a first slot in which said split annular bearing is retained, the depth of said slot being less than the thickness of said slit annular bearing.

4. A bearing according to claim 3 and further including a second slot in said control electrode interior of said first slot for accommodating said electrical conducting parts, said second slot having dimensions such that when the bearing is installed said electrically conductive parts do not touch the control electrode and further including a third slot interior of said second slot in which said contact spring is mounted laterally, the dimensions of said third slot being only slightly larger than the cross section of said contact spring.

5. A bearing according to claim 4 wherein said first second and third slots are arranged symmetrically to a common axis.

6. A bearing according to claim 5 wherein said contact spring is bent so that in the assembled condition it pushes the electrical conductive parts against said inner conductor continuously while the counter force developed pushes said contact springs firmly against said control electrode.

7. The bearing according to claim 6 wherein the holes in said split annular bearing are elongated holes.

8. A bearing according to claim 7 wherein said electrical conductive parts are ball shaped.

9. A bearing according to claim 8 wherein said balls are made of bronze.

10. A bearing according to claim 9 wherein said split annular bearing is made of a flat strip of carbon enriched polytetrafluorethylene whose ends are cut at an angle.

* * * * *